United States Patent [19]

McDonald

[11] 4,059,188
[45] Nov. 22, 1977

[54] MANUAL PREFORM REMOVAL DEVICE

[75] Inventor: David Ian McDonald, Cincinnati, Ohio

[73] Assignee: Cincinnati Milacron Inc., Cincinnati, Ohio

[21] Appl. No.: 697,861

[22] Filed: June 21, 1976

Related U.S. Application Data

[63] Continuation-in-part of Ser. No. 668,323, March 18, 1976.

[51] Int. Cl.² .............................................. B65G 15/00
[52] U.S. Cl. .................................... 198/477; 198/479; 198/482; 198/483; 198/502; 198/653
[58] Field of Search ............... 198/477, 478, 479, 482, 198/502, 653, 796, 483; 214/1 BA

[56] References Cited

U.S. PATENT DOCUMENTS

| | | | |
|---|---|---|---|
| 2,210,529 | 8/1940 | Dostal | 198/653 |
| 2,258,717 | 10/1941 | Read | 198/653 X |
| 3,305,074 | 2/1967 | Chamberlin | 198/653 X |
| 3,593,862 | 7/1971 | Pierson | 198/796 X |

Primary Examiner—Evon C. Blunk
Assistant Examiner—Douglas D. Watts
Attorney, Agent, or Firm—Daniel P. Worth

[57] ABSTRACT

A manually operated four bar linkage on a conveying device permits manual removal of preforms or other workpieces when they have not been ejected from the device at the desired unloading station. The linkage device has a cam track located adjacent to the return path of an endless type conveyor. The cam track is manually brought into conjunction with the couplings or collets which have accidentally retained a preform to force the coupling mechanism to move to a release position thus enabling manual removal of the preform. Preferably a bar or similar knock-out device is located downstream of the point where the cam track engages the coupling to ensure that all such preforms or other workpieces are removed.

6 Claims, 8 Drawing Figures

MANUAL PREFORM REMOVAL DEVICE

BACKGROUND AND SUMMARY OF INVENTION

The present invention is a continuation-in-part of pending U.S. Pat. application Ser. No. 668,323 filed Mar. 18, 1976 and, further, is an improvement in U.S. Pat. No. 3,958,685 which patent is expressly incorporated by reference herein to the maximum extent permissable.

The present invention relates to an improved conveyor system for handling a workpiece of elongated nature. One aspect of the present invention is a manually operated device for assisting in removing an accidentally retained preform combined with a conveyor system that is used to transport thermoplastic resin preforms through an oven. An aspect of the invention is a manually operated preform removal means added to a conveyor system. The invention for purposes of illustration but not limitation will be described in connection with means for handling workpieces comprising injection molded biaxially orientable plastic preforms (of acrylonitrile or polyethylene terephthalate, for instance) that are being reheated to a carefully controlled temperature immediately prior to being blow molded into a bottle with a threaded neck for closure by a threaded closure. The preform described herein is shaped like a test-tube, i.e. a hollow body with a circular cross-section. The parts of the coupling engaging the preform likewise have a circular cross-section.

Preforms are very difficult to manually remove from a coupling having bell crank or finger type coupling as shown in FIGS. 4 and 5 below. The present invention facilitates removal of accidentally retained preforms from such a coupling.

Other objects, advantages and features of the invention will become apparent from a reading of the following disclosure in conjunction with the annexed drawings wherein:

FIG. 1 is a side view with side plate removed and in partial section showing a manually operated removing means combined with a conveyor having a plurality of couplings and with workpieces e.g. preforms, engaged by couplings wherein the removing means is shown in solid lines in the engaged position and in ghost or dotted lines in the disengaged position;

FIG. 2 is an end view from the loading end and in partial section along 2—2 of FIG. 1 showing the removing means in engaged position as well as parts of the invention described in U.S. Pat. No. 3,958,685;

FIGS. 4 and 5 are enlarged side cross sections of a coupling on a carrier bar and release cam in, respectively, a workpiece engaging or holding position and workpiece releasing or loading position;

FIG. 5A is an isometric view of the bell crank;

GENERAL

For convenience, the same reference numbers are used herein as in said U.S. Pat. No. 3,958,685; the subject matter of the present invention for the most part has reference numbers 400 and above.

Figure 6:
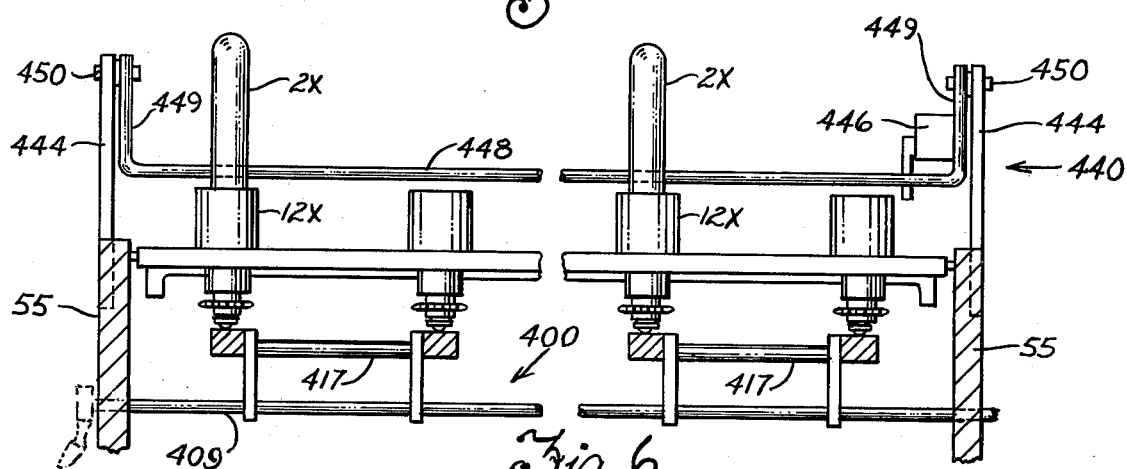
FIG. 6 is an end view along 6—6 of FIG. 1 showing the relation of the shut-off bar, cam track, couplings, and accidentally retained preforms.

For purpose of illustration, a preferred embodiment of the invention is described combined with means for conveying preforms 2 of polyethylene terephthalate shaped as shown in FIGS. 4, 5 and 6. As already noted, the conveying means is as described in U.S. Pat. No. 3,958,685 and has an oven 9 for heating preforms to a predetermined condition (FIGS. 1, 2 and 3) using the conveyor 10 of FIGS. 1, 2 and 3 and then to release the preform by appropriate means (FIGS. 3 and 5) for direction to a blow molding means 11 of any conventional type. Inasmuch as the oven and blow molding means are not part of this invention, no further description of either will be given. The workpiece 2 is held or engaged by a coupling 12 constructed as in FIGS. 4 and 5 from the time it is loaded by the loading assembly of FIGS. 6 and 7 until it is released at the other end of the conveyor by release cam means 15 further described with respect to FIGS. 3 and 5. The coupling is continuously rotated during the time is passes through the oven 9 to achieve a uniform application of intense heat, hence a uniform temperature. The conveyor itself has an array of couplings 12 and alternately advances and stops (i.e. stop and go advancement) the couplings periodically so that loading by the assembly 8 (FIGS. 6, 7) takes place during those times the couplngs 12 are not advancing even though some of them may be rotating.

The workpiece being handled preferably has a shaped portion contoured for engagement and most preferably has a head on top of a long body so that the coupling detents can engage and hold under the head: for present purposes it is assumed to be a preform of soft plastic material shaped generally like a test tube with a threaded lip 16 (FIGS. 4, 5, 6) for use in blowing bottle. Such a preform due to, inter alia, the extreme stresses to which it will be subjected during blowing, filling, and capping has a neck construction comprising an externally threaded lip 16 superimposed immediately above a pilfer proof ring 17, which is spaced closely above a support ring 18. The pilfer proof ring and threads are of course used in connection with filling and capping the ultimate container. The preform and the bottle made from the preform is hung from the support ring 18 during many manufacturing operations, in the manner shown in FIGS. 6 and 7, for example.

Figure 1:
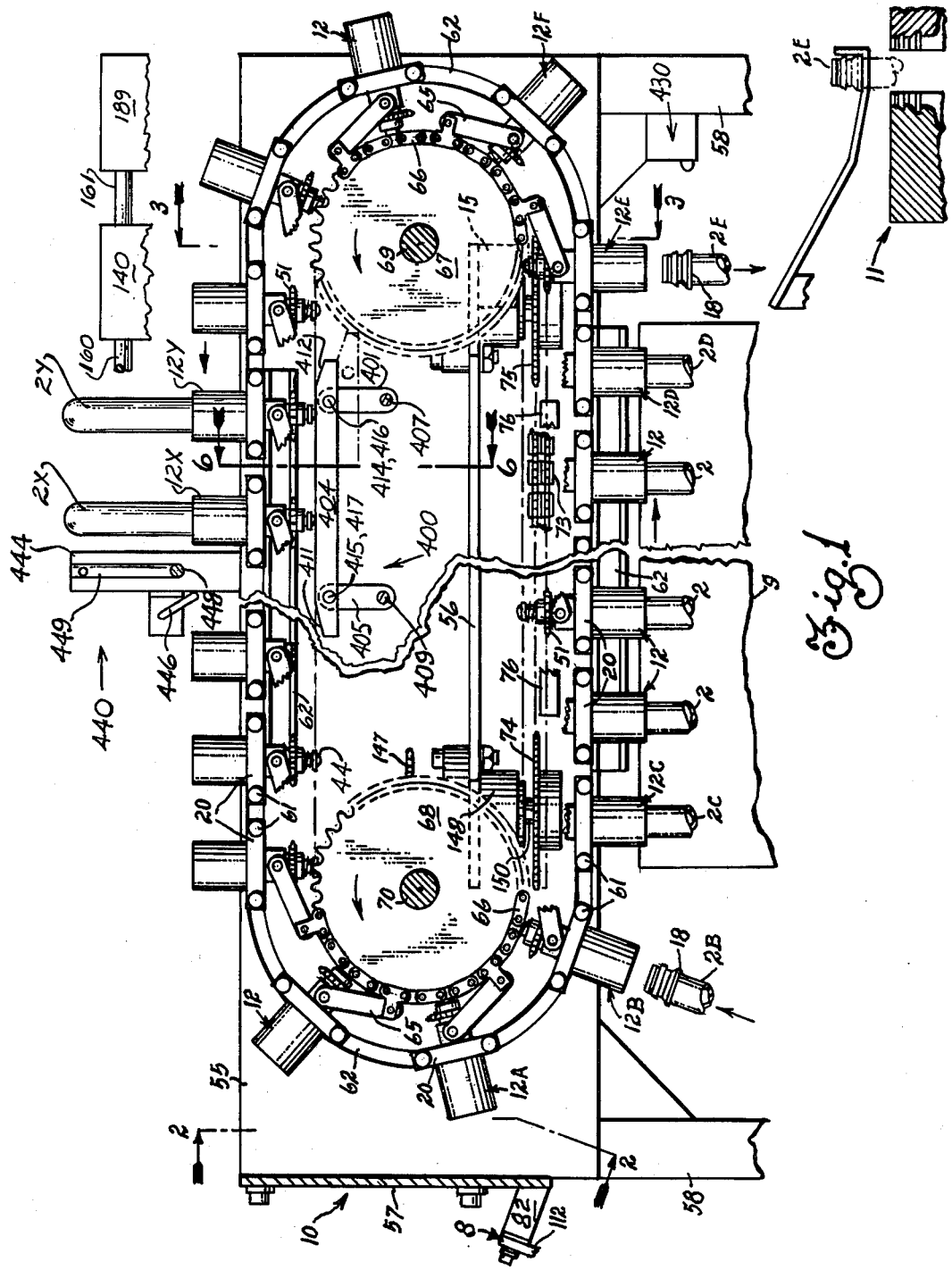
Figure 7:
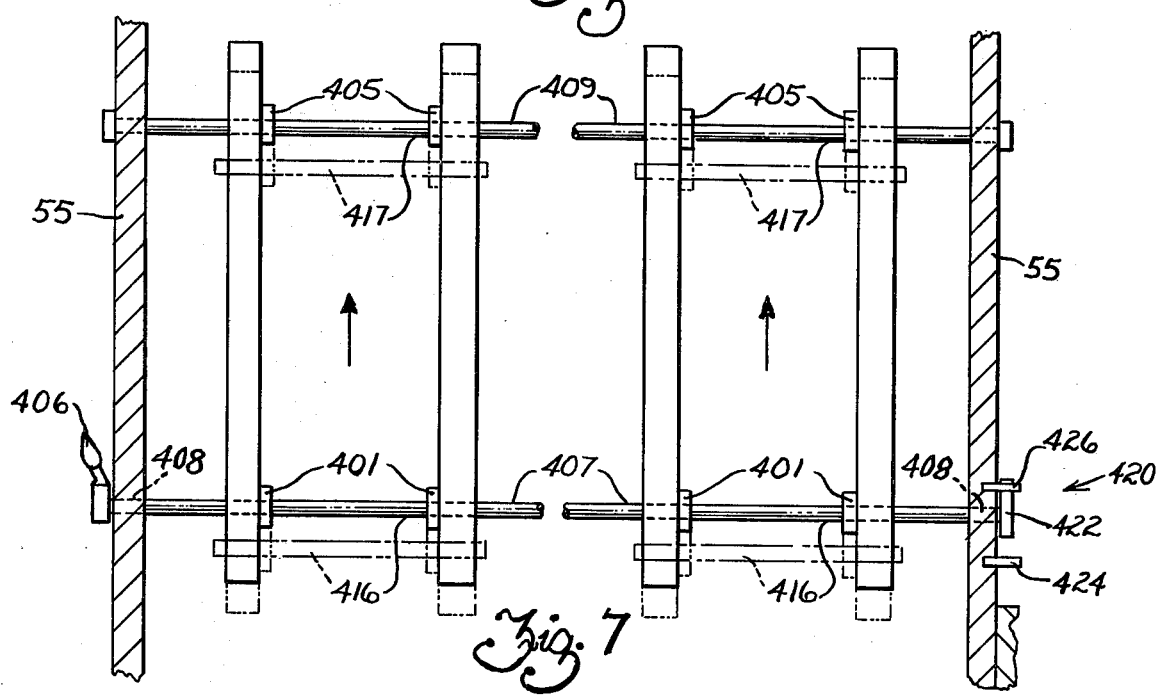
FIG. 7 is a top view of the removing means only as seen along 7—7 of FIG. 3.

Injection molded preforms are loaded by hand or by some appropriate loading device into the loading assembly 8 of FIGS. 6 and 7 which is connected to the left end of the FIG. 1 conveyor. This loading assembly is operated in timed relationship to the movement of the conveyor 10 and of each individual coupling 12 whereby each preform is fed to the coupling while the latter is temporarily held in the load position (reference 12b) in FIGS. 1 and 6. The coupling parts are during loading held in the open (release) position of FIG. 5 until the workpiece is seated after which the coupling is closed, i.e. moved to the engaged or holding position of FIG. 4. Once the workpiece or preform has been thus loaded in the coupling 12B the conveyor once again resumes its advance whereupon each loaded coupling (e.g. 12C — 12D) is continuously rotated while being moved from position to position in a periodic fashion through the oven and to the point of release 12E shown at the right side of FIG. 1 and in FIGS. 3 and 5.

Figure 2:
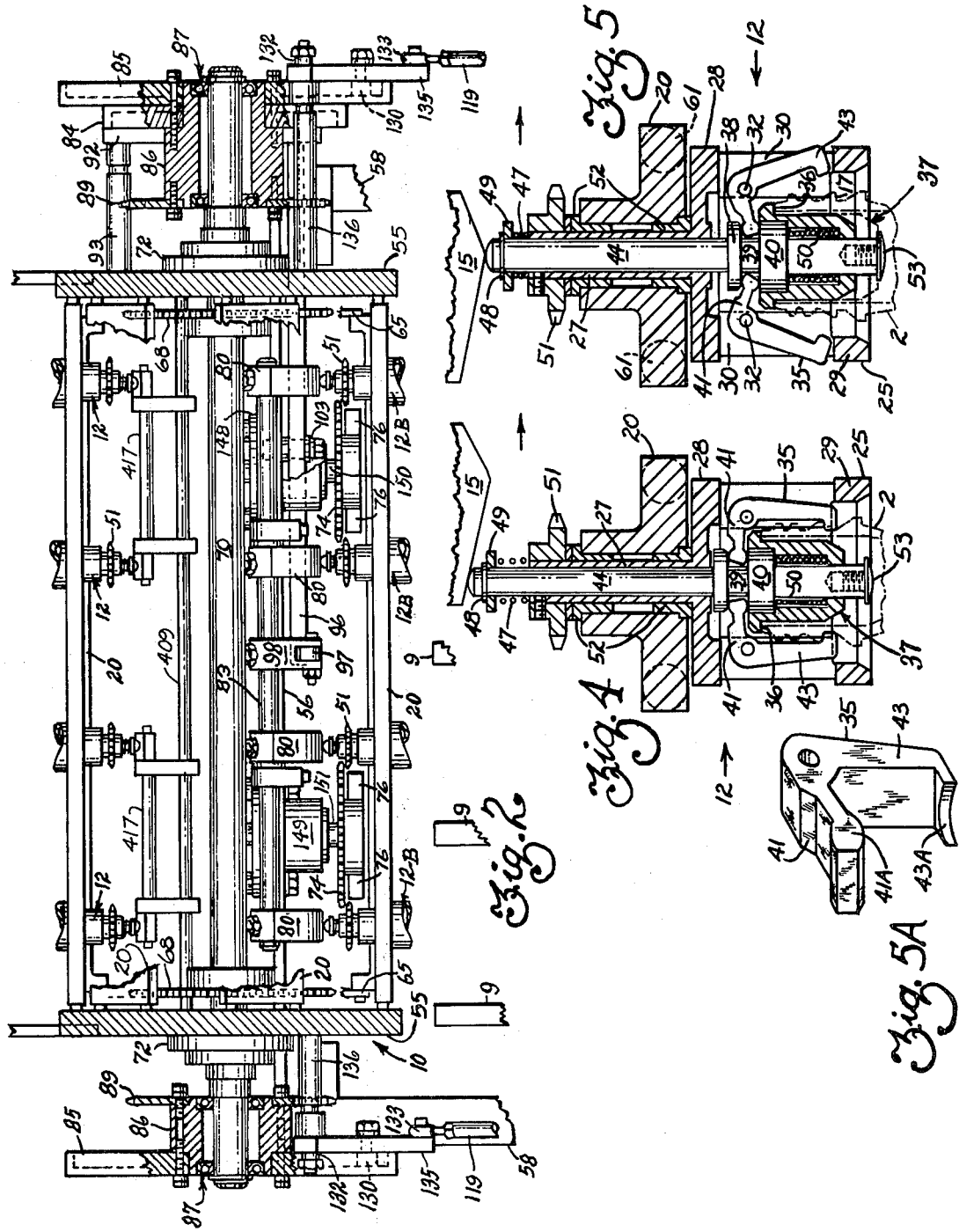
Figure 3:
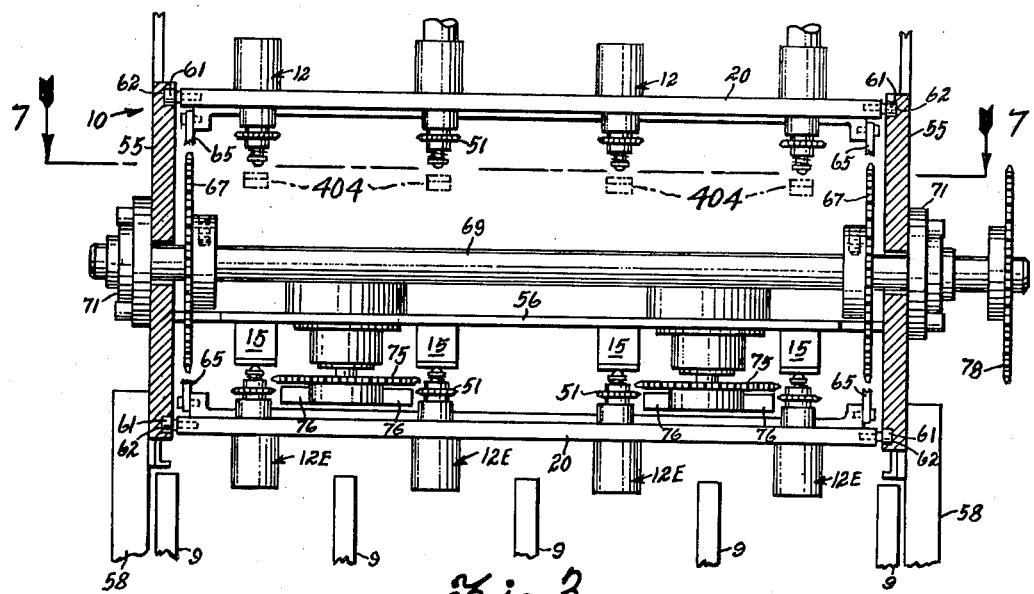
FIG. 3 is an end view at the release or discharge end of the machine in partial section along line 3—3 of FIG. 1 showing part of the removing means disengaged and in dotted lines as well as parts further described in said U.S. patents.

As should be apparent from viewing the drawings, especially FIGS. 1–3, an array of couplings is presented in a rank and file fashion. The illustrated embodiment (FIGS. 2, 3) shows a plurality of couplings ranked four abreast on a carrier bar 20 whereby these four are able to move in unison through all operations to simultaneously deliver four preforms to the blow mold 11. Also, as shown best in FIG. 1, the couplings are likewise arranged in a file fashion, that is, one behind the other, so that the loaded couplings are able to move under the motive power supplied by the conveyor from the loading station 8 through the oven 9 to the release point 12E (adjacent a chute to blow molds 11 which is illustrated with the usual vertical spacing due to space limitations) and the empty couplings then return to the loading station and so forth repeatedly.

The conveyor 10 provides appropriate means for causing the continuous rotation of each loaded coupling while at the same time providing for intermittent advancement of the coupling from the loading to the unloading end of the machine.

COUPLING OR COLLET, FIGS. 4, 5

The preferred embodiment of the collet or coupling 12 to be used in the present invention is illustrated in cross-section in FIGS. 4 and 5. FIG. 4 illustrates the position of the various coupling parts when a preform or other workpiece is engaged or held by the coupling or when the coupling is empty and being returned for reloading. FIG. 5 illustrates the relative position of the parts when the coupling is empty and being returned for reloading. FIG. 5 illustrates the relative position of the parts when the coupling is releasing or receiving a workpiece. FIGS. 16, 17 illustrate an alternative embodiment of the coupling of an internal or expanding chuck type. Both of these embodiments preferably are circular in cross-section, provide a structure to shield the bottle preform neck from heat, to grip the preform by its neck, to permit twirling or rotating the preform, and to hold the preform in a substantially vertical position depending from the embodiment being used while conveying the preform through a process, most likely a heating — rather reheating — process.

The couplng 12 engages and releases the preform responsive to relative motion between its several parts, which motion converts axial to radial motion. The coupling comprises a first cup-shaped member 25 which is the outermost member and forms a support from which a hollow stem 27 rises upwardly. Cup 25 has a closed end 28 from which the hollow stem 27 arises and a tubular, preferably cylindrical wall 29.

Thus, the present invention will be seen to include a removal assisting means combined with a coupling and conveyor means to form a machine that carries a workpiece substantially vertical while twirling. The collet or coupling includes a radially moving detent member such as a bell crank 35 (preferably an opposed pair each having a radially movable arm for grasping the workpiece externally).

The depending cylindrical wall 29 has a pair of diametrally opposed windows 30 therethrough. Mounted in each window to pivot about a pin 32 is a bell crank (also called herein a finger or detent) 35 which is actuated by means to be described below in such a way as to grasp and to release the workpiece. Detent 35 has a crank arm 41 and a grasping arm 43. Preferably, the bell crank grasps the workpiece on the underside of the antipilfering ring 17, the slope of which is such that inward radial motion of the detent grasping arm 43 drives the upper end to lift the preform firmly against the lower face of flange 36 parts of ejector 37 and which is the preform seat and is retained in the upper end of the cup 25 in the position shown in FIG. 4 with the spring 50 at least partly compressed. The top face of seat flange 36 is substantially aligned with the shoulder or face on the bottom retaining ring 40 that forms the detent actuating groove 39 with the lower face of an upper ring 38. Rings 38, 40 and groove 39 are integral with the follower 44.

Each bell crank or detent 35 is preferably constructed as in FIG. 5A and has a crank arm 41 with a follower surface 41A on its outboard end that engages the two faces forming the groove 39. The detent also has a grasping arm 43 on the end of which is a contoured grasping surface 43A for wedging the preform up against the seat 36 as mentioned above. A follower 44 is revolvably and reciprocably mounted within the stem 27. The shoulders or rings 38, 40 defining the groove 39 are preferably integral with the follower 44 and are positioned as shown in FIGS. 4 and 5 to cooperate with the detents 35 and swing the detents 35, i.e. the grasping arm 43 and its surface 43A, clear of any grasping position with the preform when the follower is fully depressed (FIG. 5) and swing the detent 35 into full engagement with the preform when the follower is in its preform-engaged or loaded position as in FIG. 4. In this way, axial motion of the follower 44 causes the detents to swing and move the grasping arm 43 radially to the extent need to engage the preform (FIG. 4) or to release the preform as in FIG. 5.

In a manner similar to the construction of the follower and carrier connection of co-pending U.S. application Ser. No. 668,323 and U.S. Pat. No. 3,958,685, referred to above, follower 44 has a resilient biasing means 47 preferably a helical holding spring compressed between the stem 27 and a retaining ring and washer 48,49 secured to the upper end of the follower, to thereby bias the lower end of the follower and the seat 36 to within the cup 25, i.e. biasing the parts into the relative positions shown in FIG. 4.

A second resilient biasing means is provided as seat spring 50 between the follower ring 40 and the workpiece seat 36. The seat 36 is arranged to slide axially on the follower to the position of facial alignment above and is secured on the lower end of the follower by a screw 53. The spring 50 urges the seat against the screw 53.

As also noted in the aforesaid co-pending application, there is secured to the upper end of the stem a sprocket or gear 51 for causing the coupling to rotate continuously about an axis through the coupling when the same is combined with the conveyor. The support stem 27 is mounted revolvably to the carrier bar by a pair of journal bearings 52 which preferably comprise permanently lubricated bushing type insert bearings that are readily obtainable commercial items.

Each coupling 12 constructed according to FIGS. 4 and 5 operates thus: the workpiece 2 is initially loaded in or is released by depressing the follower 44 which compresses the holding spring 47 and moves the seat 36 axially down toward the FIG. 5 position whereupon the ejection assisting means of the seat 36 and spring 50 operate so that the seat spring 50 urges the seat 36 down to where the screw 53 stops further seat movement:

responsive to these actions the grasping arms 43 of each detent 35 is radially moved out into its window aperture 30. Thereby releasing the workpiece. The parts at this time reach the FIG. 5 position and if a workpiece is in the coupling at beginning, it is released but if the coupling is empty it is loaded by inserting a workpiece 2 and moving it axially until the detents 35 engage it by ultimately assuming the FIG. 4 position. The holding function proceeds in substantially the reverse order of the steps first recited and the detents 35 upon swinging back through the windows 30 become fully engaged with the preform. Thus, relative axial motion between the follower and cup 44,25 is converted into radial motion of the detents 35.

THE REMOVAL DEVICE

Referring now to FIGS. 1, 2, 3, 6 and 7 the removal device 400 is illustrated as a four bar linkage. In the interest of rigidity and ability to apply sufficient force to the couplings 12X,12Y to be actuated, a plurality of removal devices 400 are supplied so that one of them can actuate the couplings 12X,12Y on each file of couplings being returned from an unload station 12E to a loading station 8,12B as elsewhere described.

Each removal device 400 consists in a four bar linkage having a drive link 401, a cam track 404, and an idler link 405 attached to the machine frame (preferably as shown between side plates 55) which is the fourth link. The idler link 405 and a handle 406 for manual operation are keyed to a common shaft 407 which runs cross-wise in the machine. The drive link 401 of each removal device supplied to each track (as best seen in FIGS. 1, 14, 15) is keyed to the shaft 407 which in turn is revolvably supported in journals 408 mounted in side plates 55 of the oven.

The idler arm(s) or links 405 are each revolvably connected at each end to a cross machine idler shaft 409 which is mounted in side plates 55 and preferably is journaled to revolve therein.

The handle 406 for selective manual operation is keyed to the cross machine shaft 407 to permit manual operation between a follower-engaged position as shown e.g. in FIG. 1 in solid lines and a non-engaged position as shown in FIG. 1 in dotted line partial view. Handle 406 is shown in phantom in FIG. 6 to illustrate its relative position. An idler shaft 409 is supported by the side plates 55 and extends completely across the machine (FIGS. 2, 7). Normally, the nonengaged position is the one assumed by this apparatus but in the event of a malfunction wherein workpieces 2X,2Y are accidentally retained the operator can move the handle 406 arcuately counterclockwise as seen in FIG. 1 to bring the cam track 404 into engagement with the followers 44 on the affected one or ones of the couplings — here 12X,12Y. Due to the way in which the removal device 400 is constructed, friction between the coupling followers 44 and the cam track 404 retains the engaged position of FIG. 1 solid line until force in the other direction is applied by the operator to return to the not engaged position.

The cam track 404 preferably has a taper or slope 411,412 at each end so that the follower is gradually engaged and disengaged.

The fore and aft cam track journals 414,415 for revolvably connecting the cam track 404 to the crank and idler arms 401,405 preferably each surround a shaft 416,417, respectively, connected between pairs of adjacent cam tracks. This provides for each pair of devices an overall rectangular or trapezoidal structure that is actuated by the key or spline connection on shaft 407 in common with the other tracks. Thus (FIGS. 6,7) there are preferably 2 each of shafts 416,417.

It will be appreciated that this ability to manually and selectively engage the cam track with the ends of followers 44 on the couplings 12 is a convenient means to correct for random malfunctions of the machine and the unloading station. Both wear and the power required, are minimized by the present design in that engagement of the follower 44 with the cam tracks is only made when the need arises instead of actuating each and every follower 44 or coupling 12. Similarly, a simple structure which is least likely to be effected by operating conditions such as the high temperatures prevailing in the oven for preheating, etc.

As best seen in FIG. 7, a limit or stop means 420 is provided at one end of the crank shaft. This stop means includes a stop arm 422 which is non-revolvably secured as by splines or keying to the crank shaft 407 and stops against two stop pins 424,426 which respectively define the limits of arcuate motion as the engaged and disengaged position. Thus, all the operator has to do is manually cause rotation of shaft 407 thereby slamming the stop arm 422 against stop pin 426 and upon a reverse action the system is returned to the non-engaged position at which the stop arm engages pin 424.

Some additional devices are associated with the removing means 400. One of these is a photocell operated alarm system 430 (FIG. 1) mounted on the machine frame closely downstream after the unloading station 12E. A conventional photocell operated electrical alarm circuit is provided here where a beam of light is aimed across the machine at a photocell target and an audible alarm such as a bell or buzzer is activated when anything breaks the beam of light. The light beam is positioned to detect any workpiece which remains in the collet 12E when it leaves the position illustrated as 12E in FIG. 1. When the operator hears the audible alarm, he merely grabs the handle, moves the cam track to the engaged position, and keeps it there until he has a chance to manually grasp and remove preforms such as 12X and 12Y which have been accidentally retained in the collet.

A fail-safe system 440 completely shuts off all electricity and other power to the machine whereupon the intermittent advance of the couplings 12 is stopped, all coupling rotation is stopped, and all heating of the oven 9 is stopped. The fail-safe consists of a U-shaped (FIG. 6) shut-off bar 442 which is journaled between two support brackets 444 (FIGS. 1 and 6) secured to sides 55. When the bar 442 is struck by any unremoved preform 12X it actuates a microswitch 446 which shuts off all power as just mentioned, either directly or through relay-operated contacts across the main electrical power leads of the entire system. The shut-off bar horizontal section 448 is mounted to barely clear the couplings 12 as they pass underneath. The vertical arms 449 of the shut-off bar are revolvably supported from the support brackets preferably by shafts or pins that pass through registering holes and are held in place by cotters, retaining rings or some similar arrangement which will permit the bar 442 to swing freely and not be mechanically interfered with for purpose of its motion which needs only to be enough to actuate the switch 446.

It will thus be apparent that the removing means 400 of the present invention is manually operated by the machine operator or attendant. The attendant is in turn advised of a random malfunction by an alarm set off by the photosystem 430 (or some similar warning device). Should the operator fail to remove any accidentally retained preforms 12X,12Y then the fail-safe system 440 takes over and shuts off the entire system. Also, it will be understood that when the removing means 400 is operated to engaged position (solid lines FIG. 1) it causes the couplings 12X, 12Y thereby engaged to move to a workpiece releasing position like that in FIG. 5. Conversely, and as explained above, when the removing means is not engaged with a follower 44 of the coupling, it assumes the dotted line position of FIG. 1, and further the coupling is in its normal or workpiece engaging position as illustrated in FIG. 4.

What is claimed is:

1. In combination with an endless conveyor for carrying in a coupling an elongated workpiece with its axis substantially normal to the direction of conveying from a loading station to an unloading station and return, the coupling having follower actuated means to grasp the workpiece which means is normally biased to a workpiece engaging condition and upon movement of the follower is actuated to a nongrasping condition by a follower motion substantially parallel to said workpiece axis thereby to release a workpiece therein or to receive a workpiece, the improvement for selectively removing on the return run of the conveyor a workpiece that has been accidentally retained in the coupling at said unloading station comprising:

means for engaging said follower on the return run before the coupling arrives at said loading station responsive to which engagement the follower is moved to a non-grasping condition and includes a four bar linkage having a cam track mounted on a pair of crank arms one at each end of said track, said cam track being movable by said means for moving into and out of engagement with said coupling follower; and means to selectively move said means for engaging into and out of engagement with said follower.

2. In the combination with the improvement according to claim 1, the further improvement including shut-off bar means located across the return run of said conveyor and relative to the return path of said coupling at a location where it will be struck by an accidentally retained workpiece.

3. In the combination and improvement thereto according to claim 2, the further improvement wherein said removing means consists in a bar supported in a cross machine position.

4. In combination with a plurality of parallel endless conveyors that move in unison, each for carrying in a plurality of couplings mounted thereon in rank and file manner a workpiece in each such coupling from a loading station to an unloading station and returning the emptied coupling to said loading station, each coupling having follower actuated means to grasp the workpiece which are actuatable between grasping and nongrasping conditions by follower motion thereby to grasp or release, respectively, the improvement for selectively removing on the return run of each such conveyor a workpiece that has been accidentally retained in a coupling at or after said unloading station comprising:

means for engaging each coupling follower in a selected rank of couplings on the return run before the coupling rank arrives at said loading station responsive to which engagement each follower is moved to a non-grasping condition each said means for engaging including a four bar linkage one bar of which is a cam track movable between follower-engaging and follower-nonengaging means, there being one such linkage provided for each return run of each conveyor, and said means to move includes means for actuating all such linkages in unison whereby the followers of at least one rank of said couplings are engaged in unison and move to a workpiece-releasing position; and means to manually and selectively move said means for engaging into and out of engagement with said follower.

5. In combination with the improvement according to claim 4, the further improvement including shut-off bar means located across the return run of said conveyor and relative to the return path of said coupling at a location where it will be struck by an accidentally retained workpiece.

6. In the combination according to claim 5, the further improvement wherein said removing means consists in a bar supported in a cross machine position.

* * * * *